United States Patent
Yao (10) Patent No.: US 12,430,659 B2
(45) Date of Patent: Sep. 30, 2025

(54) INFORMATION PROCESSING FOR IMAGES OF INTEREST

(71) Applicant: CANON KABUSHIKI KAISHA, Tokyo (JP)

(72) Inventor: Tetsuhiko Yao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 243 days.

(21) Appl. No.: 17/952,372

(22) Filed: Sep. 26, 2022

(65) Prior Publication Data

US 2023/0111269 A1    Apr. 13, 2023

(30) Foreign Application Priority Data

Oct. 13, 2021 (JP) ................. 2021-168019

(51) Int. Cl.
*G06Q 30/0201* (2023.01)
*G06T 7/66* (2017.01)
*G06V 10/40* (2022.01)

(52) U.S. Cl.
CPC .......... *G06Q 30/0201* (2013.01); *G06T 7/66* (2017.01); *G06V 10/40* (2022.01)

(58) Field of Classification Search
None
See application file for complete search history.

(56) References Cited

U.S. PATENT DOCUMENTS

| | | | | |
|---|---|---|---|---|
| 2007/0076960 A1* | 4/2007 | Takamori | ............. | G06V 40/172 |
| | | | | 348/231.2 |
| 2007/0177805 A1* | 8/2007 | Gallagher | ............. | G06V 10/84 |
| | | | | 707/E17.026 |
| 2013/0182963 A1* | 7/2013 | Cok | ........................ | G06V 20/30 |
| | | | | 382/228 |
| 2013/0336599 A1* | 12/2013 | Richards | .................. | H04N 1/62 |
| | | | | 382/284 |
| 2015/0049910 A1* | 2/2015 | Ptucha | ................... | G06V 40/16 |
| | | | | 382/118 |
| 2016/0019433 A1* | 1/2016 | Saito | ................... | G06F 16/5866 |
| | | | | 709/203 |
| 2017/0032178 A1* | 2/2017 | Henry | .................. | G06V 10/993 |
| 2017/0352083 A1* | 12/2017 | Ruck | ...................... | G06Q 50/01 |
| 2020/0210688 A1* | 7/2020 | Xu | ........................ | G06V 40/171 |

FOREIGN PATENT DOCUMENTS

JP     2015-70505 A     4/2015

OTHER PUBLICATIONS

Choi, et al. "Automatic face annotation in personal photo collections using context-based unsupervised clustering and face information fusion," 2010, IEEE Transactions on Circuits and systems for Video Technology, pp. 1292-1309 (Year: 2010).*

* cited by examiner

*Primary Examiner* — Ivan R Goldberg
(74) *Attorney, Agent, or Firm* — Carter, DeLuca & Farrell LLP (57) ABSTRACT

To make it possible to provide a photograph that meets the preference of a user. History information on an image purchased or viewed by a user and user information associating the user and a specific object with each other are obtained. Next, based on the obtained history information and the obtained user information, a weight for the preference of the user is derived. Then, based on the derived weight for the preference of the user, a still image that meets the preference of the user is generated.

15 Claims, 11 Drawing Sheets

| User ID | OBJECT OF INTEREST | MAIN OBJECT DEGREE WEIGHT COEFFICIENT | EMOTION EXPRESSION DEGREE WEIGHT COEFFICIENT | OBJECT TO BE CAPTURED TOGETHER WEIGHT COEFFICIENT |
|---|---|---|---|---|
| User_A | Obj_Y | 10 | 15 | Obj_X(10)/Obj_Z(5) |
| User_B | Obj_X | 20 | 30 | Obj_Z(30) |
| User_B | Obj_Z | 30 | 20 | Obj_X(30)/Obj_Y(15) |
| User_C | Obj_α | 20 | 10 | Obj_Y(20) |

PREFERENCE INFORMATION FOR EACH USER

| OBJECT | MAIN OBJECT DEGREE | EMOTION EXPRESSION DEGREE | OBJECT TO BE CAPTURED TOGETHER |
|---|---|---|---|
| Obj_X | 2 | 3 | Obj_Y/Obj_Z |
| Obj_Y | 8 | 7 | Obj_X/Obj_Z |
| Obj_Z | 3 | 6 | Obj_X/Obj_Y |

FEATURE AMOUNT

| User ID | DEGREE OF INTEREST SCORE | |
|---------|--------------------------|---|
| User_A | 200 | 1001 |
| User_B | 415 (160+255) | 1002 |
| User_C | 0 | 1003 |

INFORMATION PROCESSING FOR IMAGES OF INTEREST

BACKGROUND

Field

The present disclosure relates to a technique to provide a photograph that meets the preference of a user.

Description of the Related Art

In a childcare service market, such as a nursery school and a kindergarten, from the standpoint of improvement of services for a guardian (parent and the like) and improvement of business efficiency, introduction of a photograph sales system via the internet is spreading rapidly. The childcare service market is expected to grow continuously in the future as well and there is a demand for a system for providing photographs that meet the preference of a guardian who utilizes the system. Japanese Patent Laid-Open No. 2015-70505 has disclosed a technique to provide a group of photographs with less variations in how well objects are captured by finding a score in accordance with how well an object is captured in each photograph for each object and giving instructions to perform image capturing in accordance with the score.

In order to increase sales in the photograph sales system as described above, it is important to prepare photographs having a strong possibility of contributing to sales, that is, photographs that meet the preference of a user more. In this regard, with the technique of Japanese Patent Laid-Open No. 2015-70505 described above, which suppresses variations among objects, it is difficult to satisfy the above-described request.

SUMMARY

The information processing apparatus according to the present disclosure obtains history information on an image purchased or viewed by a user, obtains user information associating the user and a specific object with each other, derives a weight for a preference of the user based on the history information and the user information, and generates a still image for the user, by imaging a specific object based on the derived weight for the preference of the user.

Further features of the present disclosure will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<Configuration of Integrated ICT Platform>

Figure 1:
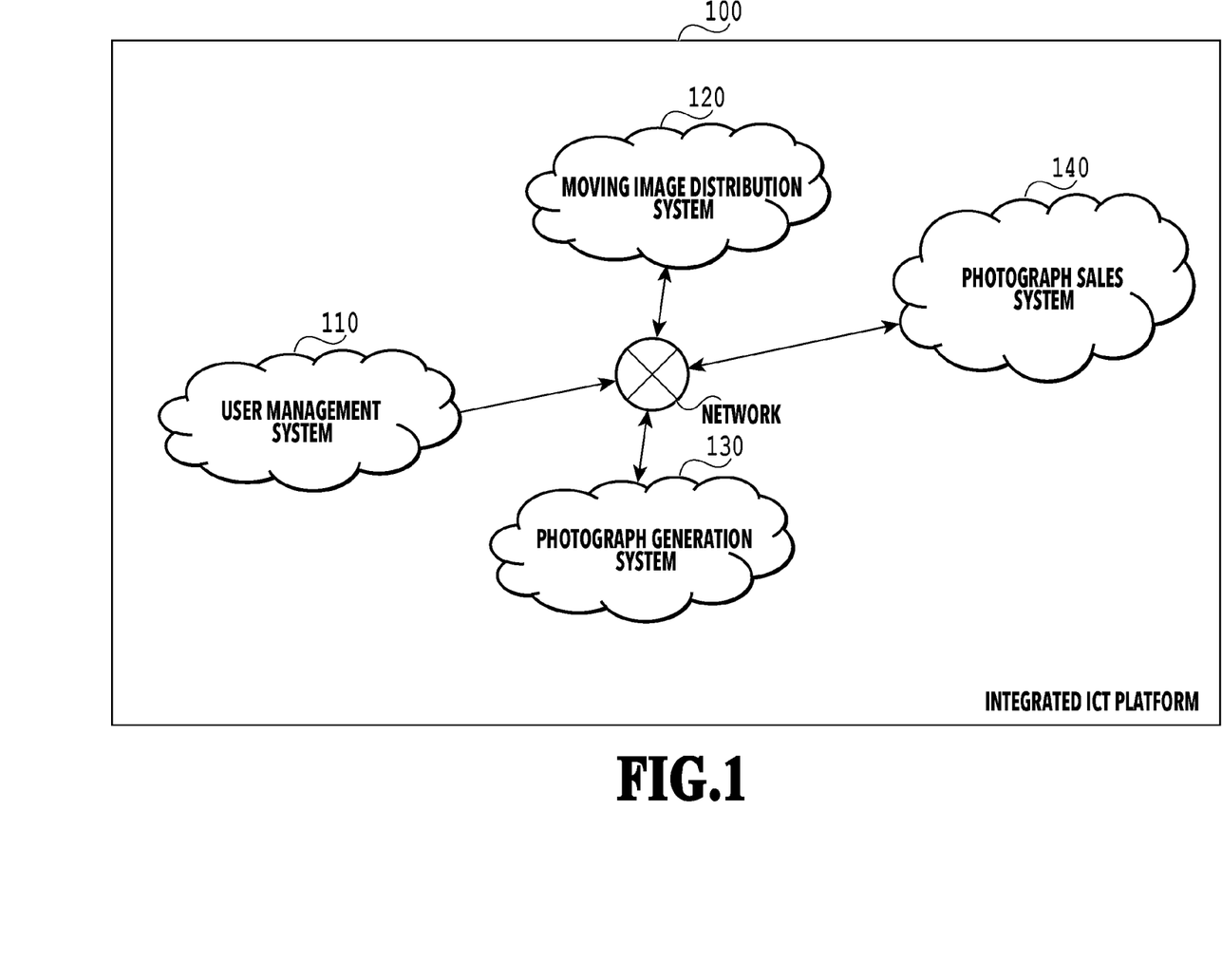
FIG. 1 is a block diagram showing a configuration example of an integrated ICT platform aiming at photograph sales.

FIG. 1 is a block diagram showing a configuration example of an integrated ICT platform aiming at photograph sales in a nursery school/kindergarten according to the present embodiment.

An integrated ICT platform 100 is a platform including a user management system 110, a moving image distribution system 120, a photograph generation system 130, and a photograph sales system 140. The integrated ICT platform 100 implements a request of a user by each of the included systems 110 to 140 cooperating with one another.

The user management system 110 stores and manages a variety of pieces of information (in the following, called "user information"), such as user ID, kindergarten child's name, and relationship between kindergarten child and guardian, relating to a guardian as a user who utilizes each system included in the integrated ICT platform 100 and provides the user information in response to a request from another system.

The moving image distribution system 120 is a system that distributes a moving image in which, for example, a kindergarten child on the way to kindergarten or within kindergarten is captured. Further, the moving image distribution system 120 stores history information on the moving image viewed by each user and the distributed moving image data in an HDD (not shown schematically) within the system.

The photograph generation system 130 is a system that generates a still image that is the source of a photograph that is sold in the photograph sales system 140 by capturing a kindergarten child within kindergarten. In the present embodiment, image capturing is performed so that a still image that meets the preference of each user is obtained by analyzing the preference of each user.

The photograph sales system 140 is a system that sells the photograph completed by printing the still image generated by the photograph generation system 130 to each user. Further, the photograph sales system 140 stores history information on the photograph viewed or purchased by each user and data of the photograph in sale or sold in an HDD (not shown schematically) within the system.

Here, the integrated ICT platform aiming at the photograph sales in a nursery school/kindergarten is taken as an example, but the present embodiment is not limited to this example. For example, it is also possible to apply the present embodiment to a system aiming at sales of photographs to spectators in a stadium in which a sports event, for example, such as baseball and soccer, is performed.

<Hardware Configuration of Photograph Generation System>

Figure 2:
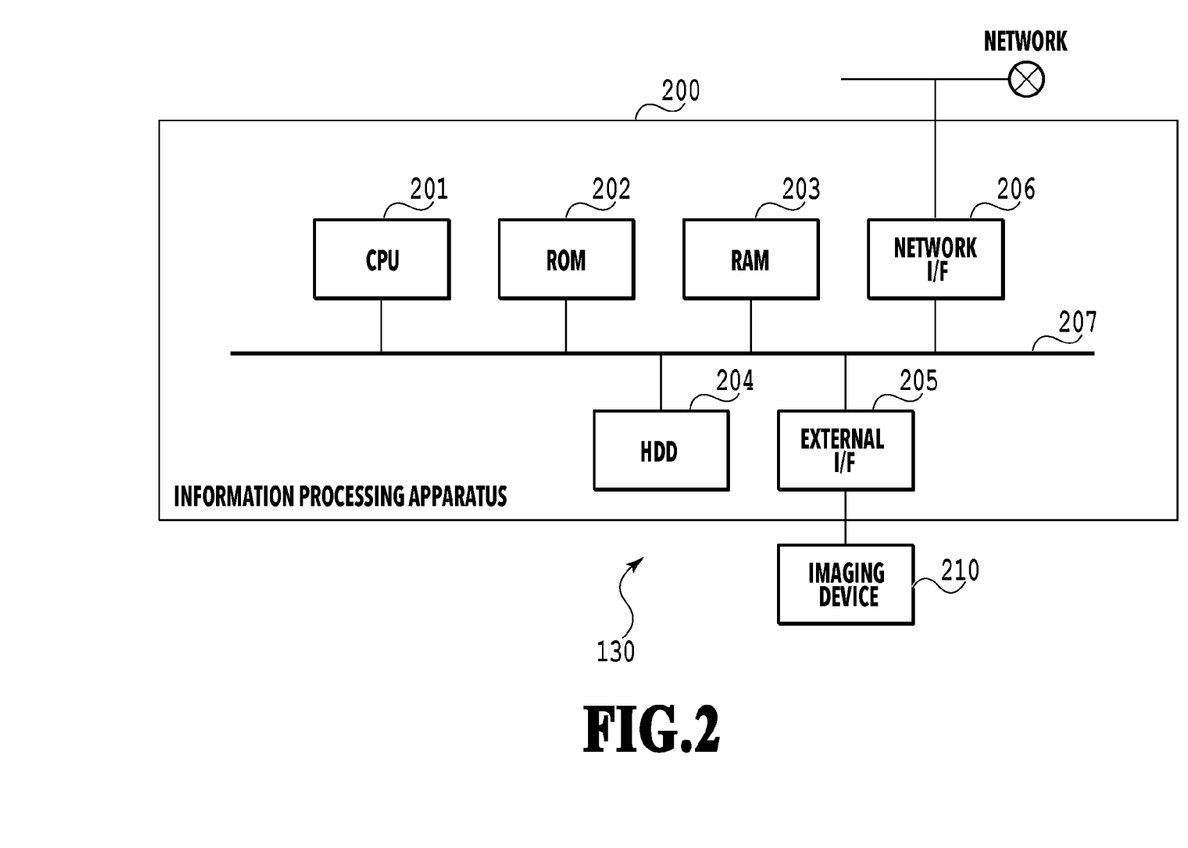
FIG. 2 is a block diagram showing a hardware configuration of a photograph generation system.

FIG. 2 is a block diagram showing the hardware configuration of the photograph generation system 130 according to the present embodiment. The photograph generation system 130 has an information processing apparatus 200 and an imaging device 210. The information processing apparatus 200 has a CPU 201, a ROM 202, a RAM 203, an HDD 204, an external I/F 205, and a network I/F 206 and these are connected to one another by a bus 207.

The CPU 201 controls the entire information processing apparatus 200 by executing programs stored in the ROM 202. The ROM 202 is a read-only memory and stores boot programs, firmware, various processing programs for implementing function units, to be described later, and various kinds of data. The RAM 203 is a work memory that temporarily stores programs and data for the CPU 201 to perform various kinds of processing. The HDD 204 is a large-capacity storage device that stores data of images captured by the imaging device 210, and the like. The external I/F 205 is an interface that performs wired or wireless communication, for example, such as USB (Universal Serial Bus) and Bluetooth (registered trademark), for connecting and controlling the imaging device 210. The network I/F 206 is an interface for performing transmission and reception of various kinds of information with an external system via the internet.

Another system included in the integrated ICT platform 100 also includes the same information processing apparatus and the like.

<Software Configuration of Photograph Generation System>

Figure 3:
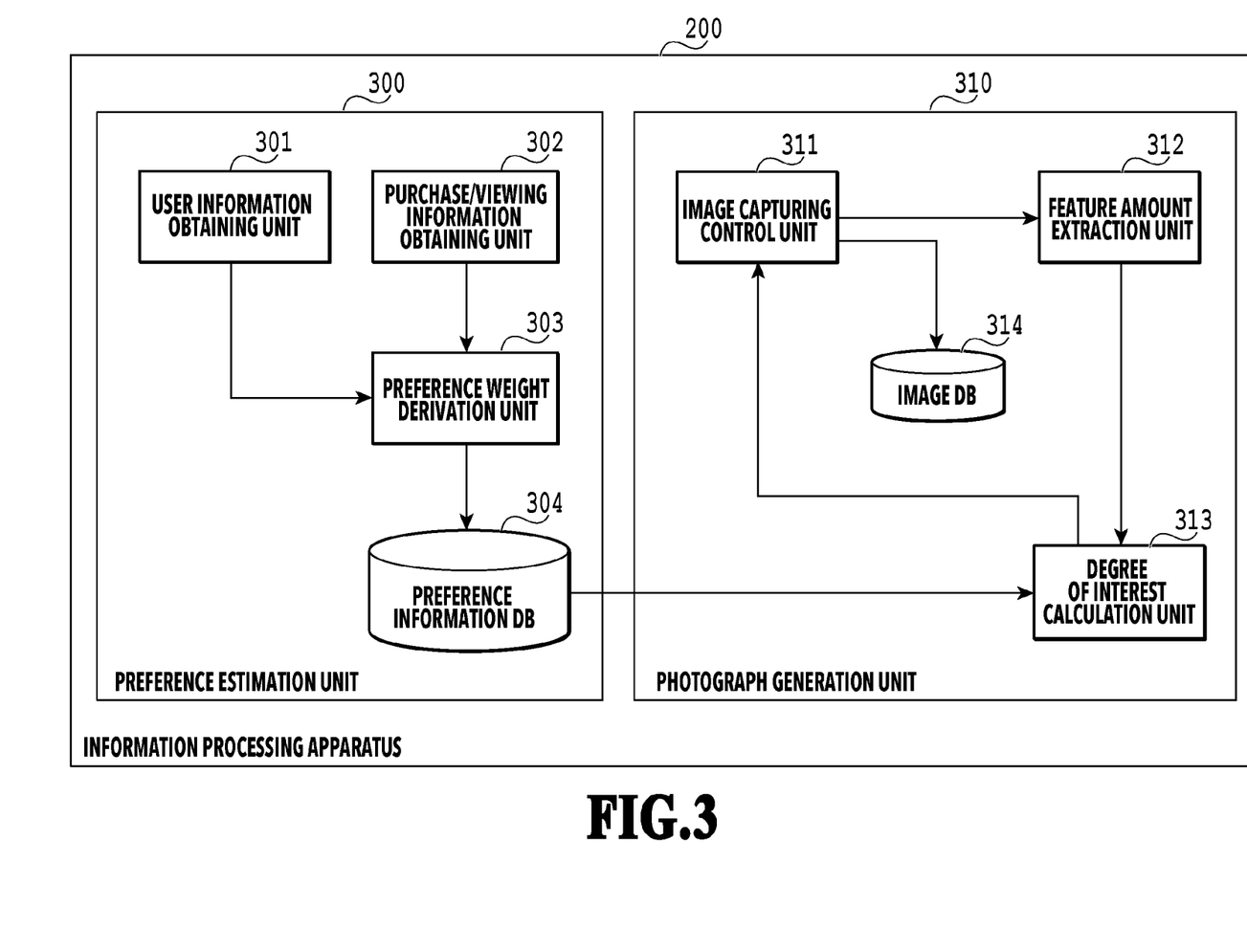
FIG. 3 is a function block diagram showing an internal configuration of a preference estimation unit and a photograph generation unit.

The photograph generation system 130 has a preference estimation unit 300 and a photograph generation unit 310. The preference estimation unit 300 performs processing to estimate the preference for photographs of each guardian (what object the guardian is interested in, what photograph the guardian tends to view or purchase, and so on), who is a user of the integrated ICT platform 100. The photograph generation unit 310 generates a photograph that meets the preference of each user, in more detail, a still image that is the source of the photograph, based on the information relating to the preference for photographs of each user obtained by the preference estimation unit 300.

FIG. 3 is a function block diagram showing the internal configuration of the preference estimation unit 300 and the photograph generation unit 310. In the following, each configuration of the preference estimation unit 300 and the photograph generation unit 310 is explained.

<<Component of Preference Estimation Unit>>

The preference estimation unit 300 includes a user information obtaining unit 301, a purchase/viewing information obtaining unit 302, and a preference weight derivation unit 303. The user information obtaining unit 301 obtains the above-described user information on guardians who utilize the integrated ICT platform 100 from the user management system 110. The purchase/viewing information obtaining unit 302 obtains information on photographs and moving images viewed or purchased by each user from the photograph sales system 140 and the moving image distribution system 120. The preference weight derivation unit 303 derives a weight coefficient for the preference for photographs of each user based on the information obtained by the user information obtaining unit 301 and the purchase/viewing information obtaining unit 302. Here, there are three kinds of weight coefficient in the present embodiment. The first is a weight coefficient for "Main Object Degree" indicating the degree in which the object of interest is the main object. The second is a weight coefficient for "Emotion Expression Degree" indicating the degree of richness of emotion of the object of interest. The third is a weight coefficient for "Object to be Captured Together" indicating another object whose presence in the photograph of the object of interest increases the willingness to purchase the photograph. The derived weight coefficients are put together for each user and stored in a preference information DB 304 as preference information for each user.

<<Component of Photograph Generation Unit>>

The photograph generation unit 310 includes an image capturing control unit 311, a feature amount extraction unit 312, and a degree of interest calculation unit 313. The image capturing control unit 311 instructs the imaging device 210 to perform image capturing and obtains a captured image obtained by the image capturing. The feature amount extraction unit 312 extracts the feature amount corresponding to the preference of a user, which is specified by the preference information for each user, for the obtained captured image. The degree of interest calculation unit 313 calculates a degree of interest (degree of interest score) of a user for the captured image based on the extracted feature amount and the preference information for each user. Data of the captured image whose calculated degree of interest score is higher than or equal to a predetermined level is stored in an image DB 314 as the still image that is provided to the photograph sales system 140.

Each function unit shown in FIG. 3 is implemented by the CPU 201 executing programs stored within the ROM 202, programs, such as applications, loaded onto the RAM 203 from the HDD 204, and the like.

<Preference Estimation Processing>

Figure 4:
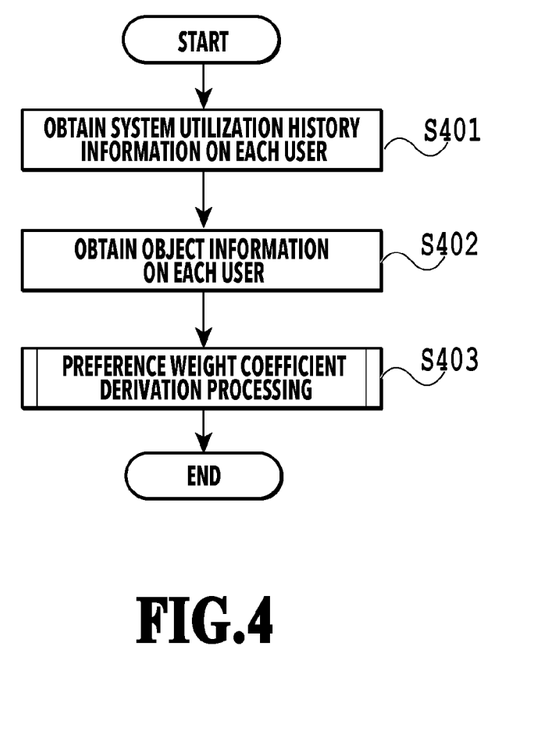
FIG. 4 is a flowchart showing a flow of processing in the preference estimation unit.

FIG. 4 is a flowchart showing a flow of processing in the preference estimation unit 300. In the following, along the flowchart in FIG. 4, processing to estimate the preference of each user is explained in detail. In the following explanation, symbol "S" means a step.

At S401, as basic information necessary for estimating the preference of each user, system utilization history information on each user is obtained. In the present embodiment, the purchase/viewing information obtaining unit 302 accesses the moving image distribution system 120 and the photograph sales system 140, respectively, and obtains moving image viewing and purchase history information and photograph viewing and purchase history information. In the moving image viewing and purchase history information, information indicating how many of which moving images are viewed by which guardian and whether one or more of the moving image are purchased by the guardian is included. Similarly, in the photograph viewing and purchase history information, information indicating how many of which photographs are viewed by which guardian and whether one or more of the photographs are purchased by the guardian is included.

At S402, as basic information necessary for estimating the preference of each user, information with which it is possible to estimate an object each user is interested in is obtained. In the present embodiment, the user information obtaining unit 301 obtains list information (kindergarten child list) that associates each guardian, whose is a system user, and a specific kindergarten child with each other.

At S403, based on the information obtained at S401 and S402, processing to calculate a weight coefficient for the preference of a user is performed for each user. In the present embodiment, the preference weight derivation unit 303 derives three weight coefficients relating to the preference for photographs of a user based on the moving image and photograph viewing and purchase history information and the kindergarten child list. Specifically, first, the object each guardian is interested in is specified from the kindergarten child list. Next, based on the number of times of viewing and the number of times of purchase of moving images and photographs in which the specified object is captured, weight coefficients for "Main Object Degree", "Emotion Expression Degree", and "Object to be Captured Together" respectively are derived. Here, with reference to another flow, more detailed explanation is given.

<<Preference Weight Coefficient Derivation Processing>>

Figure 5:
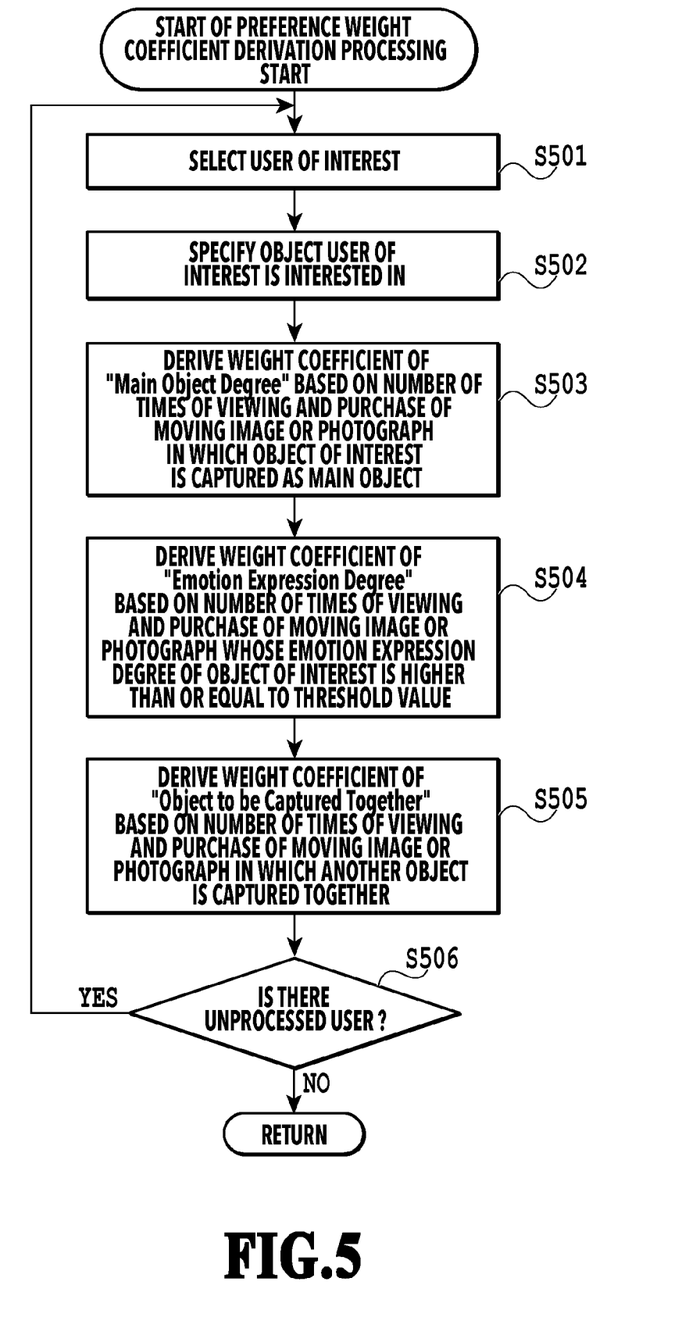
FIG. 5 is a flowchart showing details of preference weight coefficient derivation processing.

FIG. 5 is a flowchart showing details of preference weight coefficient derivation processing.

At S501, from among guardians described in the kindergarten child list, a guardian of interest (user of interest) is selected. Table 1 below is an example of the kindergarten child list and for example, it is sufficient to select the user of interest in order from "guardian A" in the uppermost row.

TABLE 1

| Guardian (User ID) | Kindergarten child (Object ID) |
| --- | --- |
| guardian A (User_A) | kindergarten child Y (Obj_Y) |
| guardian B (User_B) | kindergarten child X (Obj_X), kindergarten child Z (Obj_Z) |
| guardian C (User_C) | kindergarten child α (Obj_α) |
| ... | ... |

At S502, the object the user of interest selected at S501 is interested in, that is, the kindergarten child associated with the guardian of interest is specified based on the above-described kindergarten child list. Here, for example, in a case where "guardian A" is selected as the user of interest, "kindergarten child Y" is specified as the object of interest.

At S503, based on the moving image and photograph viewing and purchase history information obtained at S401, for the moving image and the photograph in which the object the user of interest is interested in is captured as the main object, the weight coefficient of "Main Object Degree" is derived based on the number of times of viewing or purchase thereof. Here, as the weight coefficient derivation method, for example, there is a method of deriving a weight coefficient by finding an accumulated value of basic points by adding "one point" in a case where one photograph in which an object a user of interest is interested in is captured as the main object is viewed and adding "five points" in a case where the photograph is purchased. Here, for example, it is assumed that "guardian A" who is a user of interest views five photographs in which "kindergarten child Y" is captured as the main object and purchases one of them. In this case, (one point×5)+(five points×1)=ten is derived as the weight coefficient of "Main Object Degree".

At S504, based on the moving image and photograph viewing and purchase history information obtained at S401, for the moving image and the photograph whose emotion expression degree of the object the user of interest is interested in is higher than or equal to a threshold value, the weight coefficient of "Emotion Expression Degree" is derived based on the number of times of viewing or purchase thereof. Here, as the weight coefficient derivation method, for example, there is a method of deriving a weight coefficient by finding an accumulated value of points by adding "one point" in a case where one photograph whose emotion expression degree of an object a user of interest is interested in is higher than or equal to a predetermined value is viewed and adding "five points" in a case where the photograph is purchased. Here, for example, it is assumed that "guardian A" who is a user of interest views five photographs in which "kindergarten child Y" who is smiling is captured and purchase two of them. In this case, (one point×5)+(five points×2)=15 is derived as the weight coefficient of "Emotion Expression Degree".

At S505, based on the moving image and photograph viewing and purchase history information obtained at S401, for the moving image and the photograph in which an object a user of interest is interested in is captured together with another object, the weight coefficient of "Object to be Captured Together" is derived based on the number of times of viewing or purchase thereof. Here, as the weight coefficient derivation method, for example, there is a method as follows. Here, it is assumed that there is a photograph in which an object a user of interest is interested in is captured together with another object. In the method, the weight coefficient is derived by finding an accumulated value of points by adding "one point" in a case where this photograph is viewed and adding "five points" in a case where the photograph is purchased. Here, for example, it is assumed that "guardian A" who is a user of interest views five photographs in which "kindergarten Y" and "kindergarten X" are captured together and purchases one of them. In this case, (one point×5)+(five points×1)=10 is derived as the weight coefficient for the "kindergarten X" as "Object to be Captured Together".

At S506, whether or not the derivation of the above-described three kinds of weight coefficient is completed for all the guardians (users) described in the kindergarten child list is determined. In a case where an unprocessed guardian remains, the next guardian is selected as the user of interest and the above-described processing is continued. On the other hand, in a case where the derivation of the above-described three kinds of weight coefficient is completed for all the guardians, the three kinds of weight coefficient derived by the processing so far are put together for each guardian and stored as the preference information for each user in the HDD 204 and this processing is exited.

Figure 6:
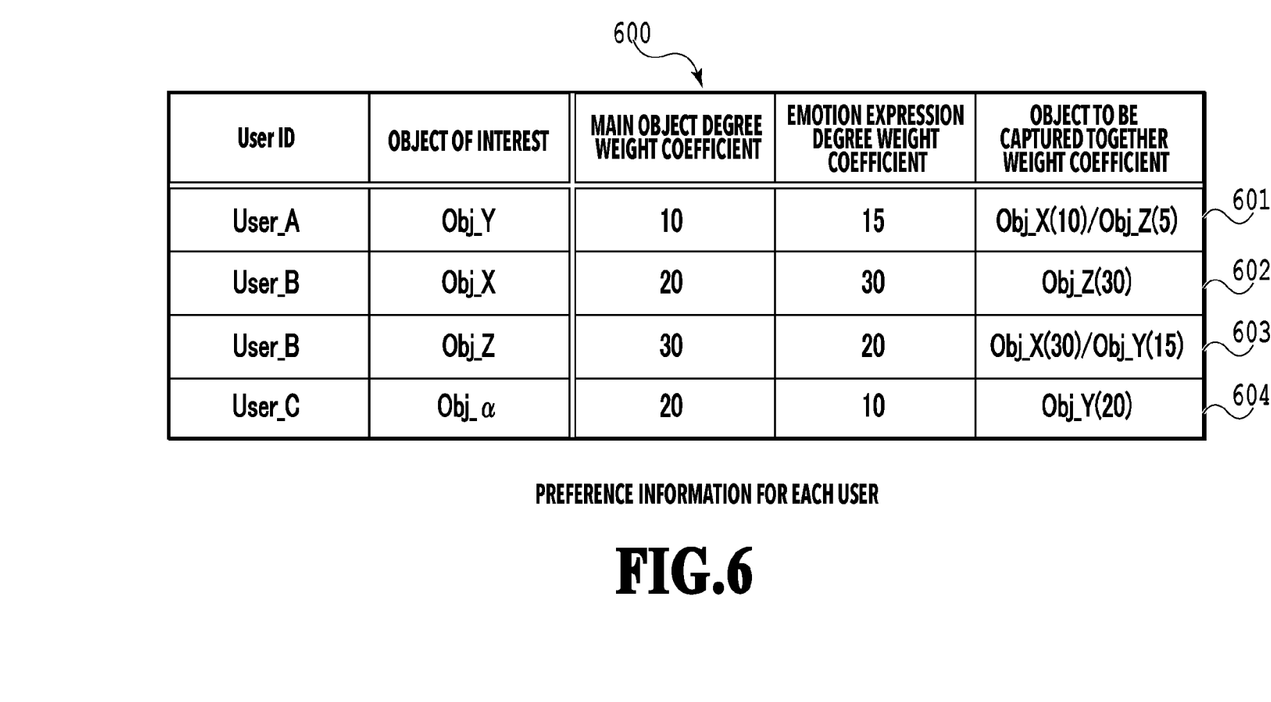
FIG. 6 is a diagram showing an example of a table as preference information for each user.

The above is the contents of the preference weight coefficient derivation processing. FIG. 6 is an example of a table as the preference information for each user, in which the three kinds of weight coefficient derived for each user as described above are put together. A table 600 includes five items, that is, "User ID", "Object of Interest", "Main Object Degree Weight Coefficient", "Emotion Expression Degree Weight Coefficient", and "Object to be Captured Together Weight Coefficient" and four records 601 to 604 in which item values are stored for each user (for each guardian) exist. In "User ID", a character string (for example, in a case of guardian A, "User_A") for uniquely identifying a user (here, guardian) is input. In "Object of Interest", a character string (for example, in a case of kindergarten child Y, "Obj_Y") for uniquely identifying an object (here, kindergarten child) each user is interested in is input. Then, in "Main Object Degree Weight Coefficient", the weight coefficient derived at S503 described above is input and in "Emotion Expression Degree Weight Coefficient", the weight coefficient derived at S504 described above is input. Then, in "Object to be Captured Together Weight Coefficient", the weight coefficient derived at S505 described above is input for each another object captured together with the object of interest.

The above is the contents of the preference weight coefficient derivation processing. It may also be possible to adjust the basic point at the time of derivation of the weight coefficient in accordance with how many photographs created based on still images whose degree of interest score based on the weight coefficient such as this is higher than or equal to a predetermined level have been purchased actually. For example, for a photograph that is viewed many times but not purchased accordingly, the point in a case where the photograph is viewed is changed from "one point" to "0.5 points" and so on.

<Still Image Generation Processing>

Figure 7:
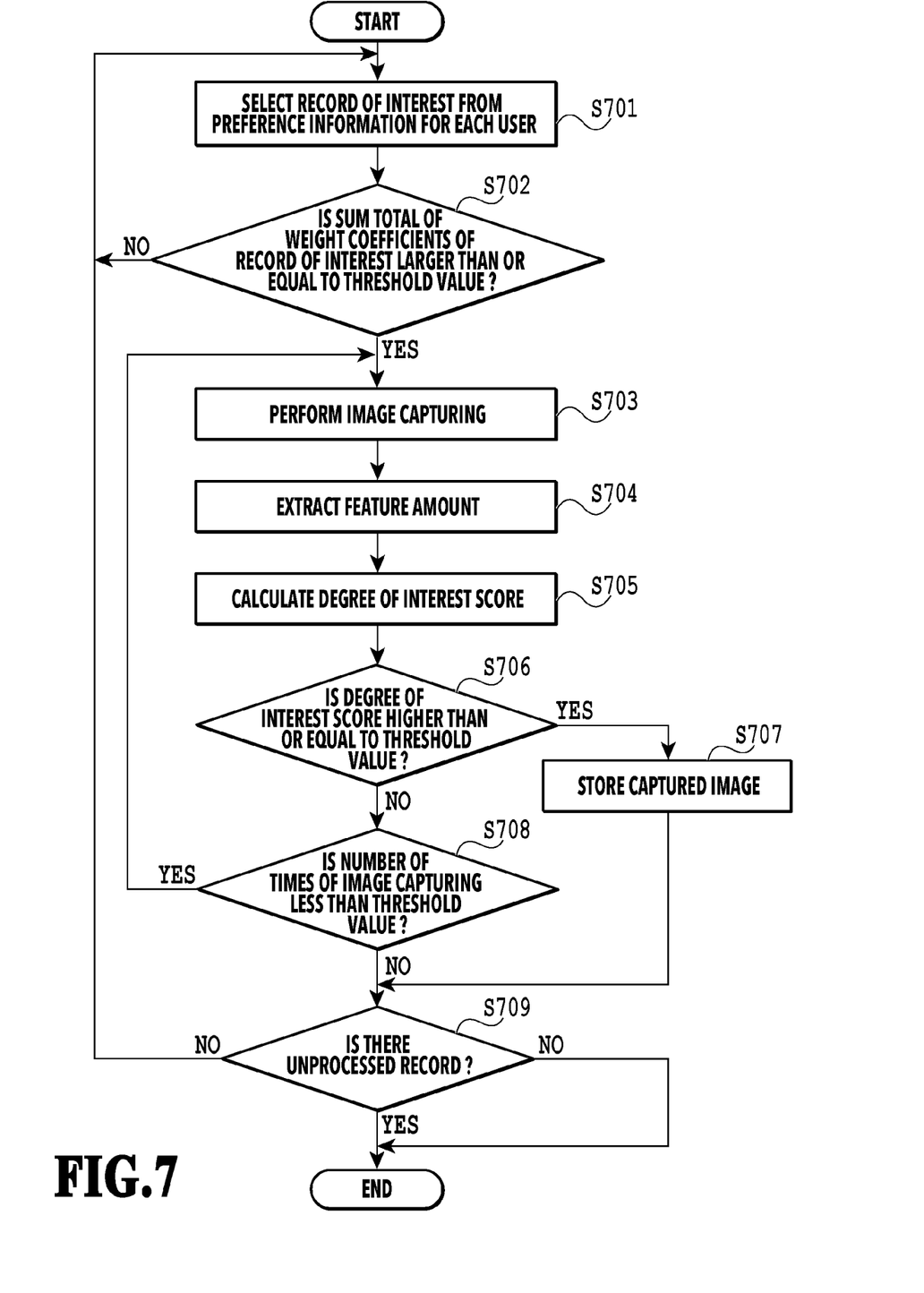
FIG. 7 is a flowchart showing a flow of processing in the photograph generation unit.

FIG. 7 is a flowchart showing a flow of still image generation processing based on the preference information for each user in the photograph generation unit 310. In the following, along the flowchart in FIG. 7, the still image generation processing is explained in detail. In the following explanation, symbol "S" means a step.

At S701, the degree of interest calculation unit 313 refers to the above-described preference information for each user and selects the record of interest, which is taken as a target of processing. In the present embodiment, the record of interest is selected in order from among the four records included in the table 600 shown in FIG. 6 as the preference information for each user. At this time, for example, it may also be possible to preferentially select the record whose sum total of the above-described three kinds of weight coefficient is high.

At S702, for the selected record of interest, whether or not the sum total of the above-described three kinds of weight coefficient exceeds a threshold value is determined. As for this threshold value, it may also be possible to set a value, for example, such as "30", as the initial value at first, and then perform adjustment to increase or decrease the threshold value in accordance with the sales of the photograph based on the still image generated by this flow. For example, in a case where the sales of the photograph are increasing, the threshold value is decreased so that more still images are generated, and so on. In a case where the determination results indicate that the sum total of the weight coefficients is larger than or equal to the threshold value, the processing advances to S703, and in a case where the sum total is less than the threshold value, the processing returns to S701 and the next record is selected as the record of interest.

Figure 8:
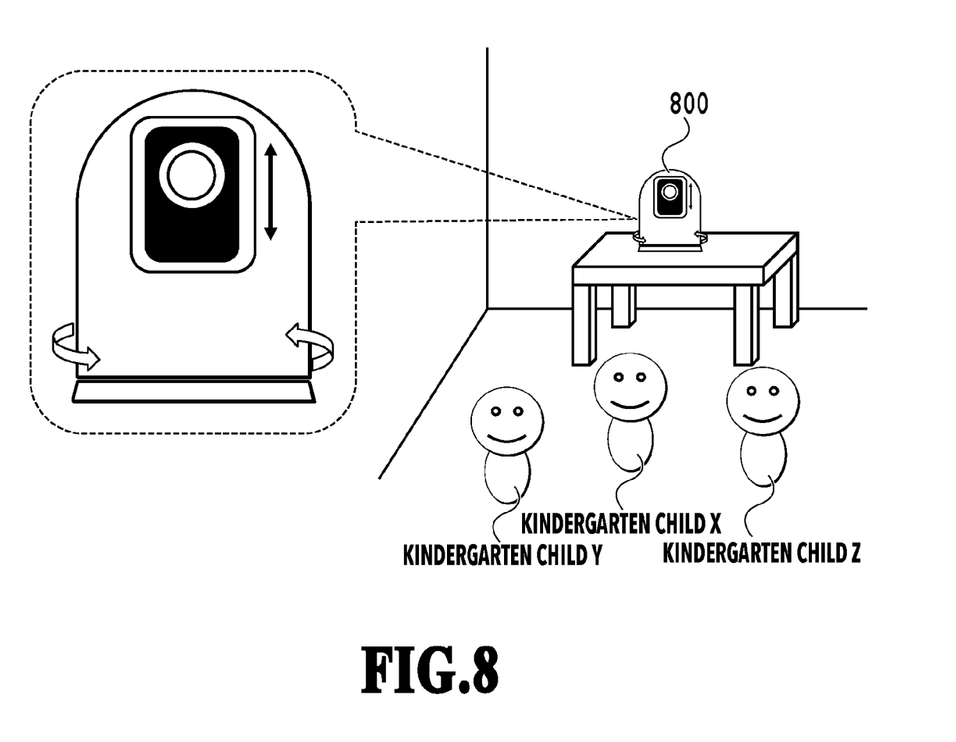
FIG. 8 is a diagram showing the way an imaging device captures kindergarten children.

At S703, the image capturing control unit 311 instructs the imaging device 210 to perform image capturing based on the record of interest selected at S701. FIG. 8 is a diagram showing the way the imaging device 210 instructed to perform image capturing captures kindergarten children present indoors. In FIG. 8, a PTZ camera 800 as the imaging device 210 is a camera capable of controlling pan, tilt, and zoom while driving the main body or the lens portion in the horizontal and vertical directions by the remote operation and it is possible to track, select, and capture a specific kindergarten child among the plurality of kindergarten children. The image capturing control unit 311 instructs the PTZ camera 800 to capture the kindergarten child specified as "Object of Interest" in the record of interest. Upon receipt of the instructions to perform image capturing, the PTZ camera 800 starts tracking the specific kindergarten child and performs image capturing at timing in accordance with the preference specified in the record of interest. The data of the image (still image) obtained by the image capturing is sent to the feature amount extraction unit 312.

Figures 9A, 9B:
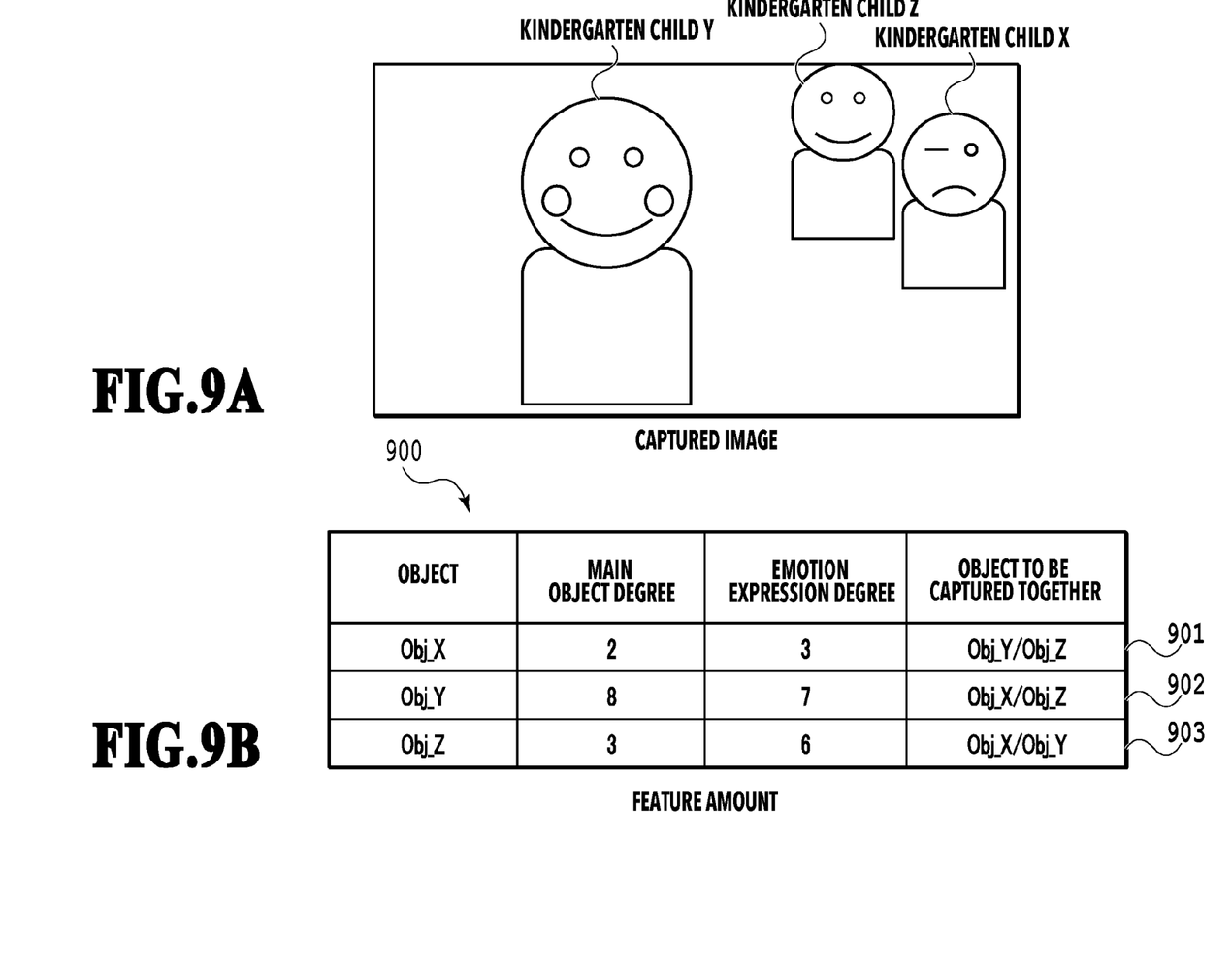
FIG. 9A is a diagram showing an example of a captured image and FIG. 9B is a diagram showing an example of a table in which feature amounts extracted from the captured image are put together.

At S704, the feature amount extraction unit 312 extracts the feature amount corresponding to each item of the preference information for each user from the captured image obtained at S703. For the extraction of the feature amount corresponding to each item, it may be possible to apply a publicly known technique. For example, it is possible to obtain the feature amount corresponding to "Main Object Degree" by specifying all the objects captured in the captured image and then calculating the percentage of the area of the object of interest corresponding to "Object of Interest" to the gross area of the captured image. Further, as regards "Emotion Expression Degree", it is possible to estimate the degree of feeling, such as joy and sorrow, by detecting the expression of the object of interest (smiling face, weeping face and the like). FIG. 9A shows the captured image obtained by the PTZ camera 800 and FIG. 9B show a table that puts together the feature amounts extracted from the captured image. Here, in the captured image in FIG. 9A, three kindergarten children X, Y, and Z are present. Here, as a result of the three persons being detected by a publicly known image analysis technique, in the item "Object", three of "Obj_X", "Obj_Y", and Obj_Z" are input. Further, in the captured image in FIG. 9A, the kindergarten child Y is captured large with a smiling face and the kindergarten child X and the kindergarten child X behind the kindergarten child Y are captured one size smaller. Consequently, a value whose minimum value is "0" and whose maximum value is "10", which corresponds to the percentage of the area occupied by each of the kindergarten children X, Y, and Z within the captured image, is input in the item "Main Object Degree". Further, a value whose minimum value is "0" and whose maximum value is "10", which corresponds to the richness in the expression in the captured image, is input in the item "Emotion Expression Degree". Furthermore, information on the other objects in a case where each of the kindergarten children X, Y, and Z is taken as a reference is input in the item "Object to be Captured Together". The feature amounts such as these are extracted from the captured image.

Figure 10:
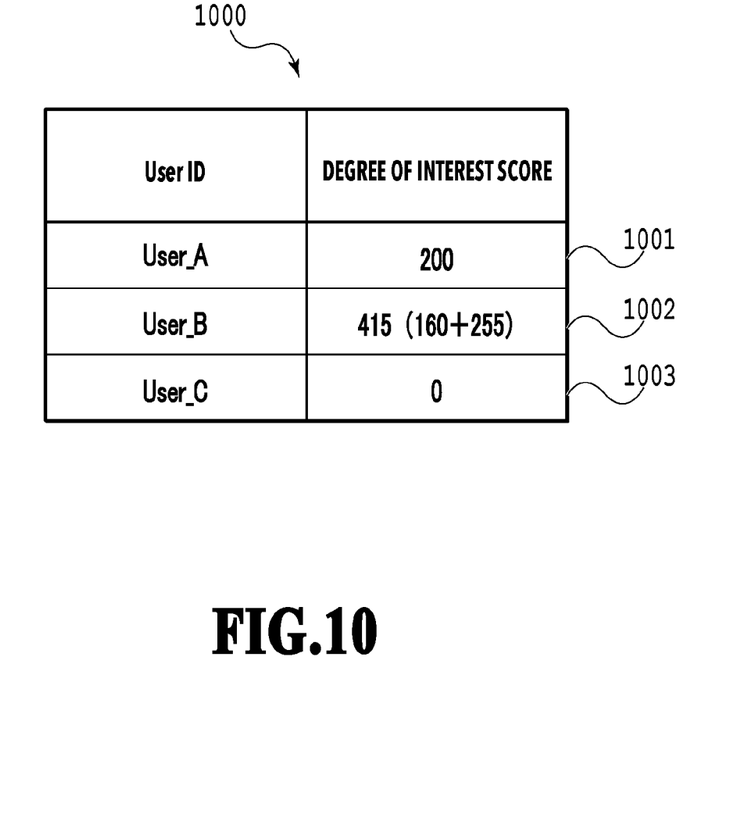
FIG. 10 is a diagram showing an example of a table in which results of calculating degree of interest scores are put together.

At S705, the degree of interest calculation unit 313 calculates the degree of interest score for the captured image obtained at S703 by using the above-described preference information for each user and the feature amount extracted at S704. Specifically, processing to multiply each feature amount of "Main Object Degree" and "Emotion Expression Degree" by each weight coefficient indicated by the preference information for each user and add the coefficient for each object, which is specified in "Object to be Captured Together", to the multiplication results is performed for each user. FIG. 10 is a table that puts together the results of calculating the degree of interest scores of "User_A", "User_B", and "User_C", with the captured image in FIG. 9A described above being taken as a target. The degree of interest score for each user shown in FIG. 10 is calculated as follows.

<<User_A>> degree of interest score=(main object degree of kindergarten child Y)×(main object degree weight coefficient of kindergarten child Y)+(emotion expression degree of kindergarten child Y)×(emotion expression degree weight coefficient of kindergarten child Y)+(weight coefficient of kindergarten child X as object to be captured together with kindergarten child Y)+(weight coefficient of kindergarten child Z as object to the captured together with kindergarten child Y)=8×10+7×15+10+5=200

<<User_B>> degree of interest score={(main object degree of kindergarten child X)×(main object degree weight coefficient of kindergarten child X)+(emotion expression degree of kindergarten child X)×(emotion expression degree weight coefficient of kindergarten child X)+(weight coefficient of kindergarten child Y as object to the captured together with kindergarten child X)+(weight coefficient of kindergarten child Z as object to be captured together with kindergarten child X)}+{(main object degree of kindergarten child Z)×(main object degree weight coefficient of kindergarten child Z)+(emotion expression degree of kindergarten child Z)×(emotion expression degree weight coefficient of kindergarten child Z)+(weight coefficient of kindergarten child X as object to be captured together with kindergarten child Z)+(weight coefficient of kindergarten child Y as object to be captured together with kindergarten child Z)}={2×20+3×30+0+30}+{3×30+6×20+30+15}=160+255=415

<<User_C>> degree of interest score=0 (kindergarten child α is not captured)

In this manner, the degree of interest score of each user for the captured image obtained at S702 is calculated.

At next S706, whether or not each degree of interest score for each user, which is calculated at S705, exceeds a threshold value is determined. As for this threshold value, it may be possible to set a value, for example, such as "100", as the initial value at first, and then perform adjustment to increase or decrease the threshold value in accordance with the correlation between the photograph actually purchased and the degree of interest score. In a case where the determination results indicate that the degree of interest score is higher than or equal to the threshold value, the processing advances to S707 and in a case where the degree of interest score is less than the threshold value, the processing advances to S708. Then, at S707, the data of the captured image obtained at S703 is stored in the HDD 204 as the image DB 314. The data of the captured image thus stored is transmitted to the photograph sales system 140 and printed, output and so on by the photograph sales system 140, and then, sold to a user.

At S708, whether or not the number of times of image capturing exceeds a threshold value is determined. As for this threshold value, it may be possible to set a value, for example, such as "10", as the initial value at first, and then perform adjustment to increase or decrease the threshold value in accordance with the the correlation between the way the degree of interest score increases and the number of times of image capturing. Further, in the second and subsequent image capturing, it may also be possible to change the image capturing conditions, such as pan, zoom, and tilt, so that a higher degree of interest score is obtained. In a case where the determination results indicate that the number of times of image capturing is larger than or equal to the threshold value, the processing advances to S709 without instructing the imaging device to perform image capturing. On the other hand, in a case where the number of times of image capturing is less than threshold value, the processing returns to S703 and image capturing is performed again and the processing for the captured image, such as the extraction of the feature amount and the calculation of the degree of interest score, is repeated.

At S709, whether or not the processing for all the records is completed is determined by referring to the above-described preference information for each user. In a case where the determination results indicate that there is an unprocessed record, the processing returns to S701 and the next record is selected as the record of interest. On the other hand, in a case where there is no unprocessed record, this processing is exited.

The above is the contents of the still image generation processing based on the preference information for each user.

Modification Example

Figure 11:
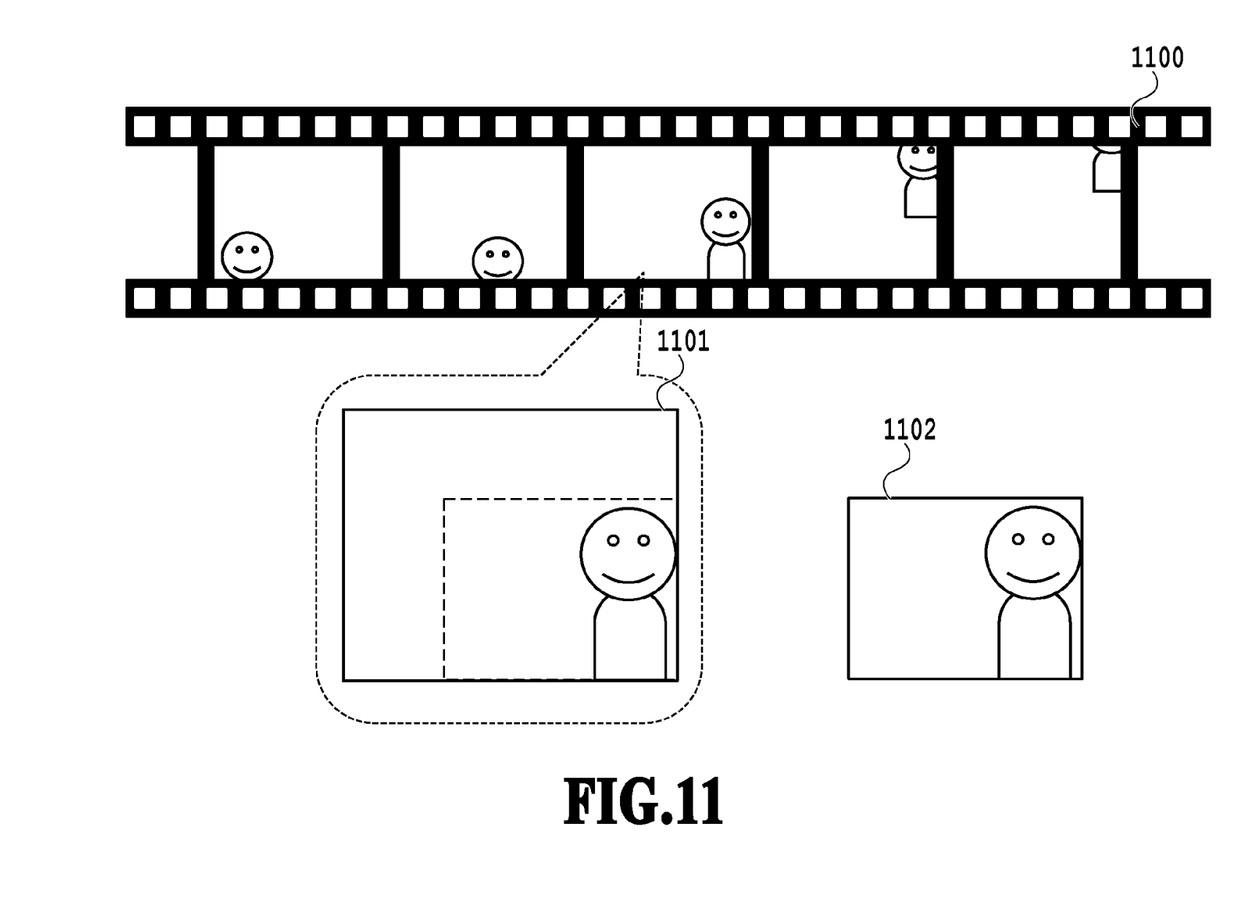
FIG. 11 is a diagram explaining the way a still image is generated from a frame of a moving image.

In the above-described embodiment, the still image is generated by performing image capturing while remotely controlling the so-called PTZ camera, but for example, it may also be possible to generate a still image that meets the interest of a user by image modification processing from an already-existing moving image or still image data. FIG. 11 is a diagram explaining the way a still image is generated from a frame of a moving image. It is possible to obtain a still image 1102 that meets the preference of a user by calculating the degree of interest score for each frame of a moving image 1100 and performing trimming for a frame 1101 whose degree of interest score exceeds a threshold value. Further, at the time of performing trimming, it may also be possible to generate still images in a plurality of patterns by changing the cut-out condition. It may be possible to obtain the moving image data, which is the processing target of the present modification example, for example, by accessing the moving image distribution system 120 in place of performing image capturing at S703. Further, it may also be possible to perform the same processing by obtaining already-existing still image data.

As above, according to the present embodiment, it is made possible to efficiently generate a still image that meets the preference of each user, which contributes to the increase in sales of the photograph sales system.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is made possible to provide a photograph that meets the preference of a user more.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-168019, filed Oct. 13, 2021 which is hereby incorporated by reference wherein in its entirety.

What is claimed is:

1. An information processing apparatus comprising:
one or more memories storing instructions; and
one or more processors executing the instructions to:
obtain history information on an image purchased or viewed by a user;
obtain user information associating the user and a specific object with each other;
derive a weight for a preference of the user for an image including the specific object indicated by the user information using a number of times of purchase or viewing of the image including the specific object indicated by the history information;
give an image capturing instruction to an imaging device in a case where the weight is larger than or equal to a threshold value;
extract a feature amount corresponding to the preference of the user from a captured image including the specific object obtained by the image capturing instruction;
calculate a degree of interest of the user for the captured image based on the feature amount and the weight;
process the captured image whose degree of interest is higher than or equal to a threshold value as an image for the user, wherein in processing the captured image:
a moving image in which an object the user is interested in is captured is obtained;
a feature amount corresponding to the preference of the user is extracted from each frame constituting the obtained moving image; and
a degree of interest of the user for each of the frames is calculated based on the feature amount corresponding to the preference of the user and the weight for the preference of the user; and
output a still image obtained by performing image modification processing for a frame whose degree of interest is higher than or equal to a threshold value, wherein the preference of the user is a degree in which an object the user is interested in is a main object, and
the derivation of the weight is performed based on a number of times of purchase and a number of times of viewing of an image in which the object the user is interested in is captured as the main object.

2. The information processing apparatus according to claim 1, wherein
the preference of the user is another object who is captured together with an object the user is interested in, and
the derivation of the weight is performed based on a number of times of purchase and a number of times of viewing of an image in which the object the user is interested in and the other object are captured together.

3. The information processing apparatus according to claim 2, wherein
in the extraction of the feature amount, the other user who is captured together with the object the user is interested in is extracted from the captured image and
the degree of interest is calculated based on the extracted other user who is captured together with the object the user is interested in and the weight for the other user who is captured together with the object the user is interested in.

4. The information processing apparatus according to claim 1, wherein
the derivation of the weight is performed by finding an accumulated value of a basic point per purchase or viewing.

5. The information processing apparatus according to claim 4, wherein
the basic point of purchase is larger than that of viewing.

6. The information processing apparatus according to claim 1, wherein
in the extraction of the feature amount, the degree in which the object the user is interested in is the main object is extracted from the captured image and
the degree of interest is calculated based on the extracted degree in which the object the user is interested in is the main object and a weight for the degree in which the object the user is interested in is the main object.

7. The information processing apparatus according to claim 1, wherein
in a case where the degree of interest is less than the threshold value, the obtaining of the captured image, the extraction of the feature amount, and the calculation of the degree of interest are performed again.

8. The information processing apparatus according to claim 1, wherein
in the obtaining of the captured image, in a case where a number of times of image capturing by the imaging device becomes larger than or equal to a threshold value, the imaging device is not instructed to perform image capturing.

9. The information processing apparatus according to claim 1, wherein
in the obtaining of the captured image, in a case where the derived weight is less than the threshold value, the imaging device is not instructed to perform image capturing.

10. The information processing apparatus according to claim 1, wherein a first weight for a degree in which the specific object is captured as a main object, a second weight for a degree of emotion expression of the specific object, and a third weight for another object which is captured together with the specific object indicated by the user information are derived as the weight for the preference of the user, and
the image capturing instruction is given to the imaging device in a case where a sum total of the first weight, the second weight, and the third weight is larger than or equal to the threshold value.

11. The information processing apparatus according to claim 1, wherein
a first weight for a degree in which the specific object is captured as a main object, a second weight for a degree of emotion expression of the specific object, and a third weight for another object which is captured together with the specific object indicated by the user information are derived as the weight for the preference of the user, the image capturing instruction is given to the imaging device in a case where a sum total of the first weight, the second weight, and the third weight is larger than or equal to the threshold value, a first feature amount corresponding to the degree in which the specific object is captured as the main object, a second feature amount corresponding to the degree of emotion expression of the specific object, and a third feature amount corresponding to the other object which is captured together with the specific object are extracted from the captured image including the specific object obtained by the image capturing instruction, the first feature amount and the second feature amount are multiplied by the first weight and the second weight, respectively, and a result of adding the third weight to the obtained multiplication results is calculated as the degree of interest of the user for the captured image, and the captured image whose degree of interest is higher than or equal to the threshold value is processed as the image for the user.

12. An information processing apparatus comprising:
one or more memories storing instructions; and
one or more processors executing the instructions to:
obtain history information on an image purchased or viewed by a user;
obtain user information associating the user and a specific object with each other;
derive a weight for a preference of the user for an image including the specific object indicated by the user information using a number of times of purchase or viewing of the image including the specific object indicated by the history information;
give an image capturing instruction to an imaging device in a case where the weight is larger than or equal to a threshold value;
extract a feature amount corresponding to the preference of the user from a captured image including the specific object obtained by the image capturing instruction;
calculate a degree of interest of the user for the captured image based on the feature amount and the weight;
process the captured image whose degree of interest is higher than or equal to a threshold value as an image for the user, wherein in processing the captured image:
a moving image in which an object the user is interested in is captured is obtained;
a feature amount corresponding to the preference of the user is extracted from each frame constituting the obtained moving image; and
a degree of interest of the user for each of the frames is calculated based on the feature amount corresponding to the preference of the user and the weight for the preference of the user; and
output a still image obtained by performing image modification processing for a frame whose degree of interest is higher than or equal to a threshold value,
wherein the preference of the user is a degree of emotion expression of an object the user is interested in, and
the derivation of the weight is performed based on a number of times of purchase and a number of times of viewing of an image whose degree of emotion expression of the object the user is interested in is higher than or equal to a threshold value.

13. The information processing apparatus according to claim 12, wherein
in the extraction of the feature amount, the degree of emotion expression of the object the user is interested in is extracted from the captured image and
the degree of interest is calculated based on the extracted degree of emotion expression of the object the user is interested in and the weight for the degree of emotion expression of the object the user is interested in.

14. A computer-implemented information processing method comprising:
obtaining history information on an image purchased or viewed by a user;
obtaining user information associating the user and a specific object with each other;
deriving a weight for a preference of the user for an image including the specific object indicated by the user information using a number of times of purchase or viewing of the image including the specific object indicated by the history information;
giving an image capturing instruction to an imaging device in a case where the weight is larger than or equal to a threshold value;
extracting a feature amount corresponding to the preference of the user from a captured image including the specific object obtained by the image capturing instruction;
calculating a degree of interest of the user for the captured image based on the feature amount and the weight;
processing the captured image whose degree of interest is higher than or equal to a threshold value as an image for the user, wherein in processing the captured image:
a moving image in which an object the user is interested in is captured is obtained;
a feature amount corresponding to the preference of the user is extracted from each frame constituting the obtained moving image; and
a degree of interest of the user for each of the frames is calculated based on the feature amount corresponding to the preference of the user and the weight for the preference of the user; and
outputting a still image obtained by performing image modification processing for a frame whose degree of interest is higher than or equal to a threshold value,
wherein the preference of the user is a degree in which an object the user is interested in is a main object, and
deriving the weight is performed based on a number of times of purchase and a number of times of viewing of an image in which the object the user is interested in is captured as the main object.

15. A non-transitory computer readable storage medium storing a program for causing a computer to perform an information processing method comprising:
obtaining history information on an image purchased or viewed by a user;
obtaining user information associating the user and a specific object with each other;
deriving a weight for a preference of the user for an image including the specific object indicated by the user information using a number of times of purchase or viewing of the image including the specific object indicated by the history information;
giving an image capturing instruction to an imaging device in a case where the weight is larger than or equal to a threshold value;

extracting a feature amount corresponding to the preference of the user from a captured image including the specific object obtained by the image capturing instruction;

calculating a degree of interest of the user for the captured image based on the feature amount and the weight; and processing the captured image whose degree of interest is higher than or equal to a threshold value as an image for the user, wherein in processing the captured image:

a moving image in which an object the user is interested in is captured is obtained;

a feature amount corresponding to the preference of the user is extracted from each frame constituting the obtained moving image; and a degree of interest of the user for each of the frames is calculated based on the feature amount corresponding to the preference of the user and the weight for the preference of the user; and outputting a still image obtained by performing image modification processing for a frame whose degree of interest is higher than or equal to a threshold value, wherein the preference of the user is a degree in which an object the user is interested in is a main object, and deriving the weight is performed based on a number of times of purchase and a number of times of viewing of an image in which the object the user is interested in is captured as the main object.

* * * * *